United States Patent [19]
Niosi

[11] Patent Number: 6,093,895
[45] Date of Patent: Jul. 25, 2000

[54] PATIENT WEIGHING APPARATUS FOR EMERGENCY MEDICAL SERVICE VEHICLES

[76] Inventor: Anthony M. Niosi, 1061 NW. 89th Ter., Pembroke Pines, Fla. 33024

[21] Appl. No.: 09/106,501

[22] Filed: Jun. 29, 1998

[51] Int. Cl.[7] .......................... G01G 19/08; G01G 19/52; G01G 19/00
[52] U.S. Cl. ........................... 177/136; 177/144; 177/245
[58] Field of Search ................................... 177/144, 136, 177/245

[56] References Cited

U.S. PATENT DOCUMENTS

| | | | |
|---|---|---|---|
| 3,722,611 | 3/1973 | Tirkkonen | 177/144 |
| 3,961,675 | 6/1976 | Siegel | 177/144 |
| 4,038,973 | 8/1977 | Moore | 177/245 |
| 4,281,730 | 8/1981 | Swersey et al. | 177/144 |
| 4,584,989 | 4/1986 | Stith | 177/144 |
| 4,669,136 | 6/1987 | Waters et al. | 177/245 |
| 5,086,856 | 2/1992 | Haggstrom | 177/211 |
| 5,990,423 | 11/1999 | Ashpes et al. | 177/144 |

*Primary Examiner*—Randy W. Gibson
*Attorney, Agent, or Firm*—Scott L. Lampert

[57] ABSTRACT

An apparatus for weighing patients in Emergency Medical Service vehicles comprising a vehicle, means for securing a stretcher in the vehicle so that each of the wheels on the stretcher are secured to the vehicle floor at a predetermined location, a plurality of generally pad-like members secured to the vehicle floor at the predetermined locations so that each of the stretcher wheels rests on one of the pad-like members when the stretcher is secured within the vehicle and a digital display electrically interconnected to the pad-like members for displaying the weight of the stretcher. Each pad-like member is structured to measure the weight of an object placed thereon.

17 Claims, 3 Drawing Sheets

PATIENT WEIGHING APPARATUS FOR EMERGENCY MEDICAL SERVICE VEHICLES

BACKGROUND OF THE INVENTION

1. Field of the Invention

The present invention relates to weighing devices and, more particularly, to an apparatus for weighing patients on stretchers inside of emergency medical service vehicles.

2. Description of the Related Art

The use of emergency medical service (EMS) vehicles in responding to medical emergencies has increased greatly over the last several years. In responding to such emergencies, it is usually necessary for the EMS technicians to immediately treat patients at the accident site, as well as in route to the hospital or medical facility. Often, such immediate treatment prevents the patient from sustaining permanent damage or even dying. Thus, the importance of administering prompt and proper treatment cannot be understated.

The treatment by the EMS technicians often times involves administering some sort of medication to the patient while the patient is on a stretcher. Typically, the proper dosage of such medication is based upon the patient's weight. However, EMS vehicles currently do not include means for weighing the patients. Thus, the EMS technician is forced to estimate the patient's weight and the dosage administered is based upon such estimate. An inaccurate estimate by the EMS technician and the subsequent inaccurate dosage administered to the patient could profoundly effect the medication's effectiveness on the patient. Moreover, applying overdosages of certain medications could adversely effect the patient's health and resultant recovery. Thus, accurately determining the patient's weight and administering the proper dosage of medication may prove to be the difference between life and death for the patient.

Estimating the weight of overweight patients and small children has proven to be especially difficult for EMS technicians. With overweight patients, the EMS technician's estimate is often off by several pounds. For instance, it is difficult to determine from merely observing an overweight person whether he or she weighs 250 pounds or 300 pounds. Such a difference could result in an estimate which is 15%–20%, or more, from the patients actual weight. With small children, it is especially vital to obtain an accurate weight. Even if the EMS technician's estimate is only be a few pounds off, such a slight difference could also result in an estimate which is 15%–20%, or more, from the child's actual weight. As previously stated, administering medication in a dosage which is 15%–20%, or more, over or under the proper dosage could prove fatal to the patient.

EMS vehicles currently do not include means for weighing patients. Although there are several prior art weighing devices, none are suited to weigh patients on a stretcher in an EMS vehicle. Furthermore, there is no disclosure nor suggestion in any of the prior art devices of such an apparatus or the need for such an apparatus. Thus, the prior art fails to provide any suggestion or motivation for one of ordinary skill in the art to modify any of the prior art devices in the manner disclosed by applicant's invention. Such lack of disclosure, suggestion or teaching in the prior art supports the conclusion that part of applicant's invention is the discovery of the problem, that is, the need for accurate weight measurement capabilities in EMS vehicles.

Accordingly, there is a need in the art for an apparatus for weighing patients inside of EMS vehicles. Any such device should be adaptable for use with the variety of different EMS vehicles in use today and should include means for weighing the patient while the patient is on a stretcher. Furthermore, any such device should be easy to use so that accurate weight measurements may be quickly attained. The present invention is particularly suited to overcome those problems which remain in the art in a manner not previously known.

SUMMARY OF THE INVENTION

The present invention is directed towards a new and improved apparatus for weighing patients in EMS vehicles comprising a vehicle, means for securing a stretcher in the vehicle so that each of the wheels on the stretcher are secured to the vehicle floor at a predetermined location and a plurality of generally pad-like members secured to the vehicle floor at the predetermined locations so that each of the stretcher wheels rests on one of the pad-like members when the stretcher is secured within the vehicle. Each pad-like member is structured to measure the weight of an object placed thereon. The apparatus further includes a digital display electrically interconnected to the pad-like members for displaying the weight of the stretcher.

It is an object of the present invention to provide a new and improved weighing apparatus which has all the advantages of the prior art devices and none of the disadvantages.

It is also an object of the present invention to provide an apparatus for weighing patients inside of EMS vehicles.

It is another object of the present invention to provide such a weighing apparatus which includes means for weighing patients on stretchers.

It is yet another object of the present invention to provide such a weighing apparatus which is adaptable for use with different EMS vehicles.

It is a further object of the present invention to provide such a weighing apparatus which is easy to use so that accurate weight measurements may be quickly attained.

These and other objects and advantages of the present invention will become more readily apparent in the description which follows.

BRIEF DESCRIPTION OF THE DRAWINGS

For a fuller understanding of the nature of the present invention, reference should be had to the following detailed description, taken in connection with the accompanying drawings in which.

Like reference numerals refer to like parts throughout the several views of the drawings.

DETAILED DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1:
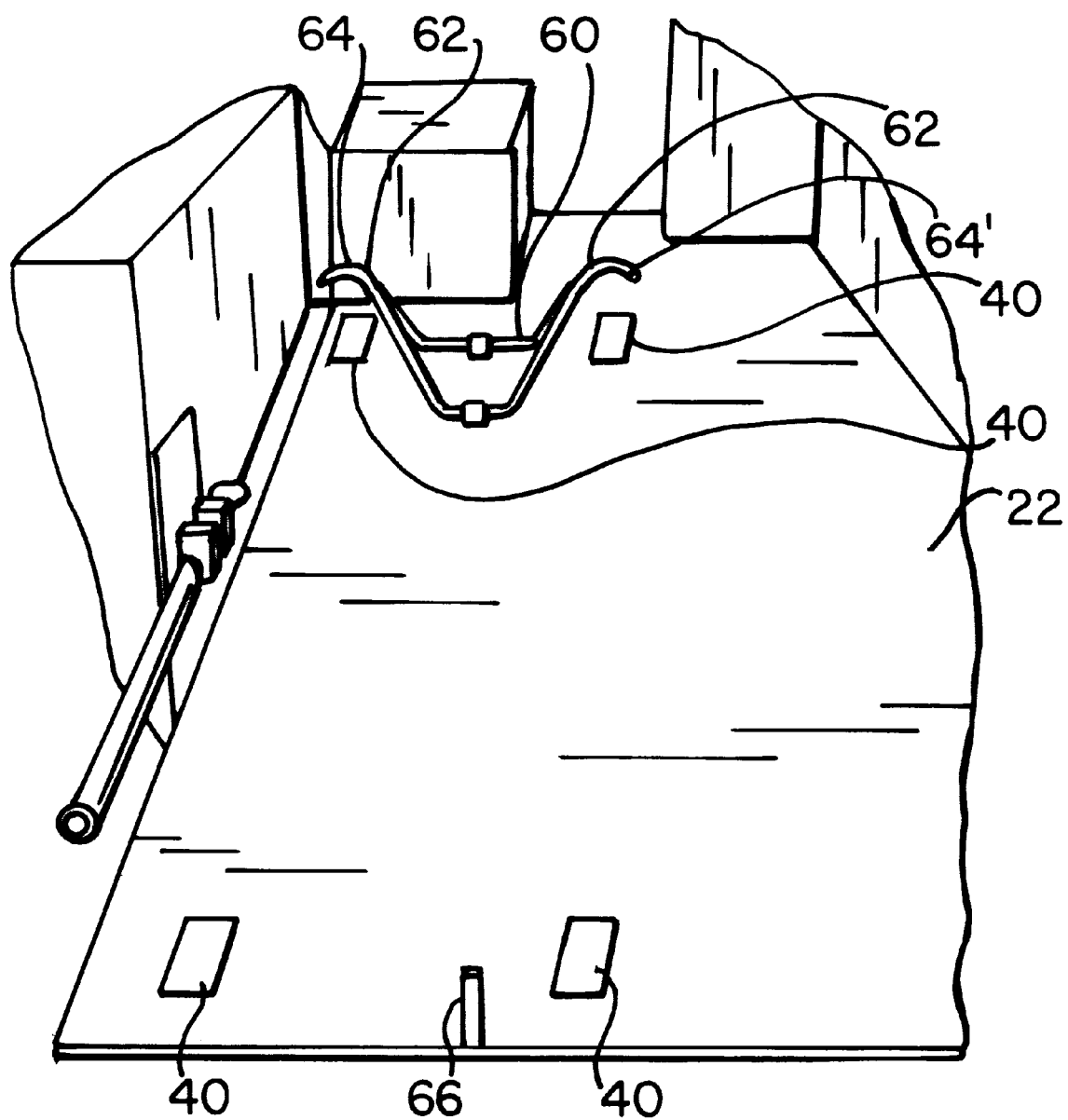
FIG. 1 is a rear perspective view of an EMS vehicle showing the pad-like weighing members and the U-shaped member for securing the stretcher in place.
Figure 2:
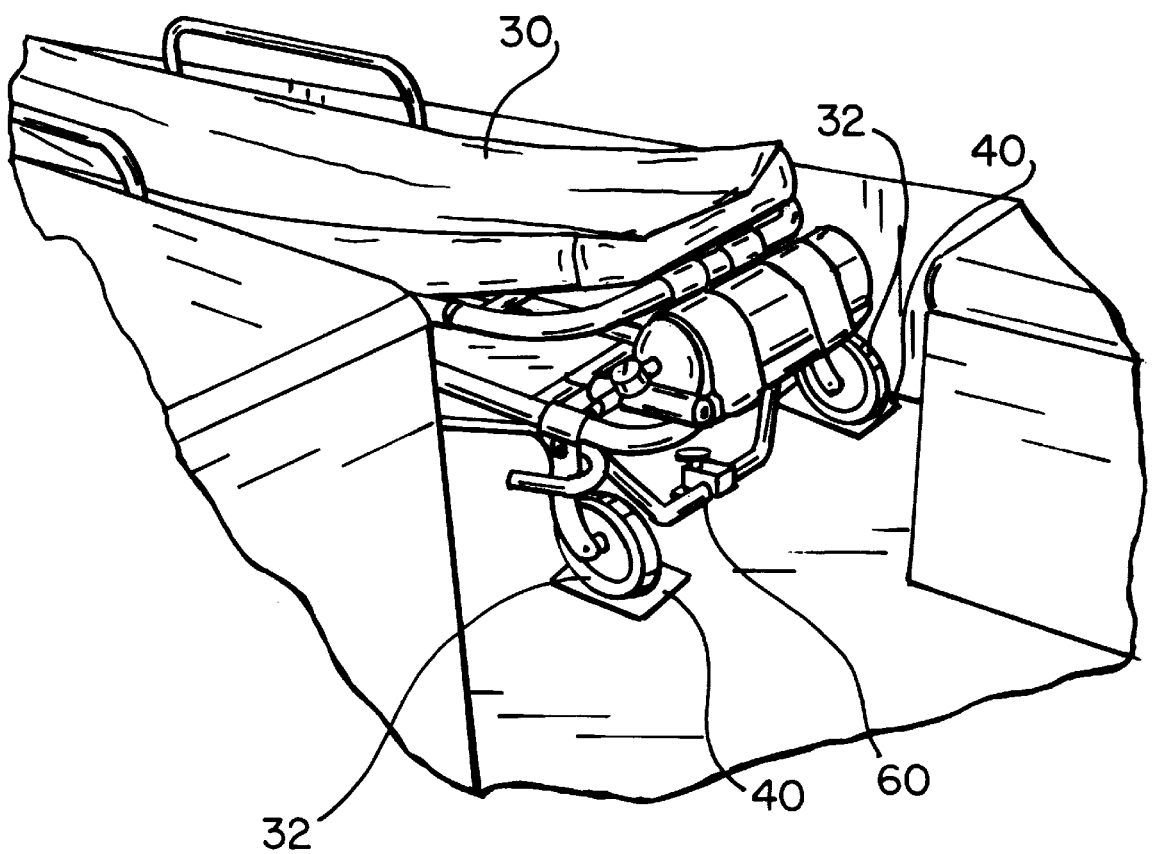
FIG. 2 is a front and side perspective view of EMS vehicle showing front wheels of the stretcher secured beneath the U-shaped member on top of the pad-like weighing members.
Figure 3:
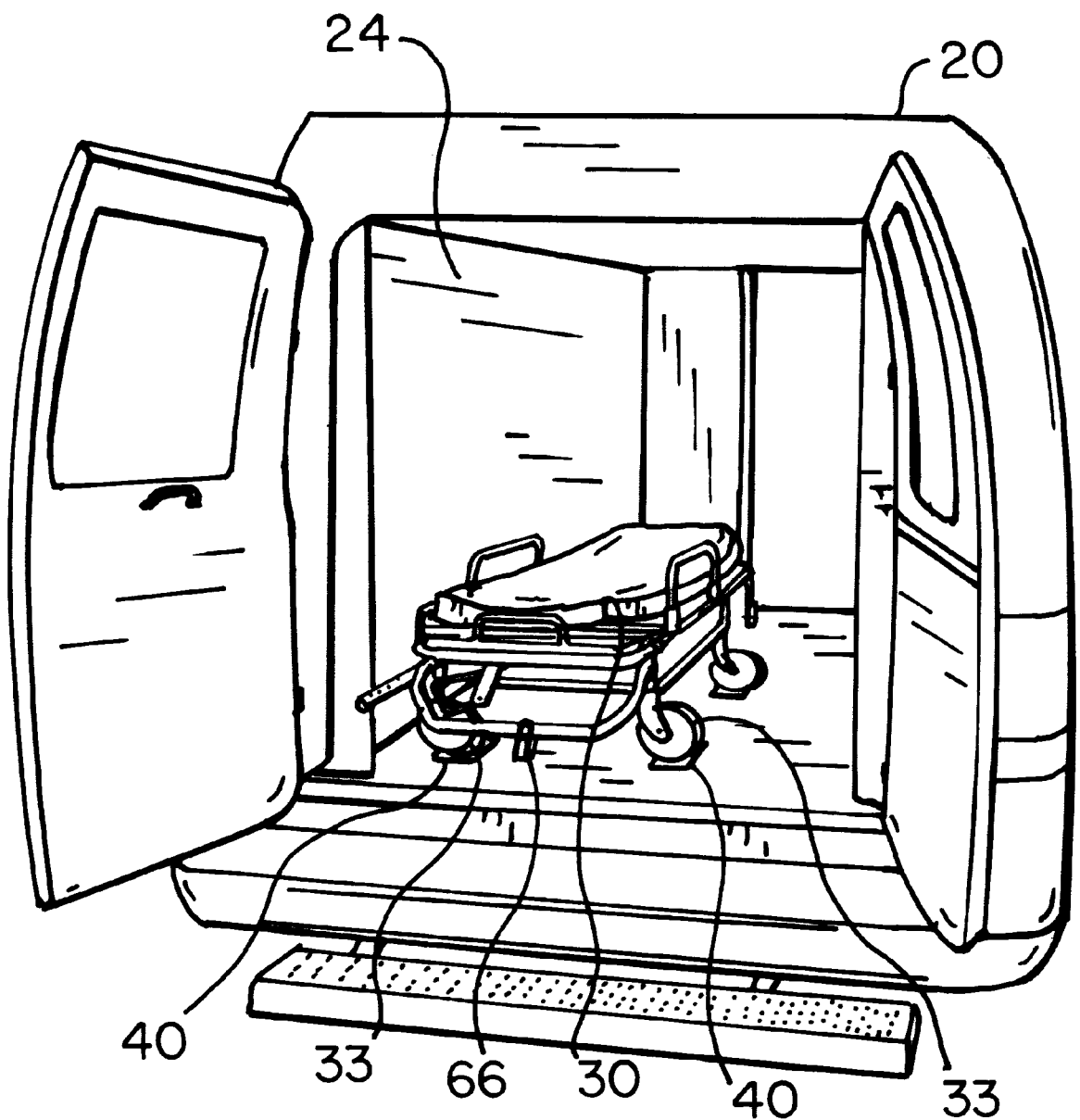
FIG. 3 is a rear perspective view of the EMS vehicle showing the rear wheels of the stretcher on the rear pad-like weighing members.

As shown in FIGS. 1–3, the present invention is directed towards a new and improved apparatus 10 for weighing patients in EMS vehicles. The apparatus 10 comprises a vehicle 20, a stretcher 30 having a plurality of wheels 32, 33, means for securing the stretcher 30 in the vehicle 20, a plurality of generally pad-like members 40 and a digital display (not shown) for displaying the weight of the stretcher 30. The stretcher 30 generally includes four wheels 32, 33 to facilitate the movement of the stretcher 30 and any patient thereon, but may, alternatively, include six or any other number of wheels.

The vehicle 20 may be one of the many types of EMS vehicles or ambulances commonly used today, which include an area 24 for carrying a stretcher 30 and EMS technicians therein. Typically, each EMS vehicle 20 includes means for securing the stretcher 30 in the vehicle 20 so that each of the wheels 32, 33 on the stretcher 30 are secured to the floor 22 of the vehicle 20 at a predetermined location. One such means, as shown in FIGS. 1 and 2, includes a generally U-shaped bracket 60 secured to the floor 22 of the vehicle 20 at a location towards the front of the carrying area 24. The uppermost ends 62 of the U-shaped bracket 60 include a flanged portion 64, 64' structured and disposed to retain the two front wheels 32 of the stretcher 30 in place, thereby securing the stretcher 30 in place. A second bracket 66, mounted to the floor 22 of the vehicle 20 at a location towards the rear of the carrying area 24, is structured and disposed to latch onto a rear portion of the stretcher 30 when the two front wheels 32 of the stretcher 30 are retained by the flanged portions 64, 64' of the U-shaped bracket 60, thereby further securing the stretcher 30 in place.

Each pad-like member 40 includes means for measuring the weight of an object placed thereon. The measuring means used in the pad-like members 40 may be one of the many different weight measuring devices or scales commonly known within the art. Plate-like weighing members or any other type of weighing structure may, alternatively, be used in lieu of the pad-like members 40.

Two of the pad-like members 40 are secured to the floor 22 of the vehicle 20 beneath the flanged portions 64, 64' of the U-shaped bracket 60 so that each of front wheels 32 of the stretcher 30 rests on one of the pad-like members 40 when the two front wheels 32 of the stretcher 30 are retained by the flanged portions 64, 64' of the U-shaped bracket 60. Two additional pad-like members 40 are secured to the floor 22 of the vehicle 20 at predetermined locations adjacent the second bracket 66 so that each of the rear wheels 33 of the stretcher 30 rest on one of the pad-like members 40 when the two front wheels 32 of the stretcher 30 are secured to the flanged portions 64, 64' of the U-shaped bracket 60. Additional pad-like members 40 may be secured to the floor 22 of the vehicle 20 at other predetermined locations to accommodate stretchers 30 having six or more wheels.

The digital display (not shown) is electrically interconnected to the pad-like members 40 and structured to display the weight measured by the pad-like members 40. Alternatively, wireless transmission means may be employed so that the weight may be measured by the pad-like members 40, a corresponding signal transmitted to the digital display (not shown) and the weight displayed on the digital display (not shown). In use, the weight measuring means in the pad-like members 40 and/or the digital display (not shown) are calibrated to account for the weight of the stretcher 30 and any equipment, blankets, etc. contained thereon so that the weight displayed on the digital display (not shown) is the weight of the patient on the stretcher 30.

The apparatus 10 may be structured for permanent installation into new or existing vehicles 20. Alternatively, the apparatus 10 may be portable, i.e., structured for removable installation into new or existing vehicles 20.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

What is claimed is:

1. An apparatus for weighing patients in emergency medical service vehicles comprising:

a vehicle having a floor, a stretcher with a plurality of wheels and means for securing said stretcher in said vehicle so that each of said plurality of wheels are secured to said floor at a predetermined location;

means for measuring the weight of said stretcher, said means for measuring the weight of said stretcher being secured to said floor at said predetermined locations so that each of said wheels of said stretcher rests thereon when said stretcher is secured within said vehicle, and means for displaying the weight of said stretcher, said means for displaying the weight of said stretcher being electrically interconnected to said means for measuring the weight of said stretcher.

2. An apparatus for weighing patients in emergency medical service vehicles as recited in claim 1 wherein said means for measuring the weight of said stretcher comprises a plurality of generally pad-like members, each of said pad-like members being structured to measure the weight of an object placed thereon.

3. An apparatus for weighing patients in emergency medical service vehicles as recited in claim 1 wherein said stretcher includes four wheels.

4. An apparatus for weighing patients in emergency medical service vehicles as recited in claim 1 wherein said stretcher includes six wheels.

5. An apparatus for weighing patients in emergency medical service vehicles as recited in claim 1 wherein said means for displaying the weight of said stretcher comprises a digital display.

6. An apparatus for weighing patients in emergency medical service vehicles as recited in claim 1 wherein said vehicle is an ambulance.

7. An apparatus for weighing patients in emergency medical service vehicles as recited in claim 1 wherein said means for measuring the weight of said stretcher comprises a plurality of generally plate-like members, each of said plate-like members being structured to measure the weight of an object placed thereon.

8. An apparatus for weighing patients in emergency medical service vehicles comprising:

a vehicle having a floor, a stretcher with a plurality of wheels and means for securing said stretcher in said vehicle so that each of said plurality of wheels are secured to said floor at a predetermined location;

a plurality of generally pad-like members secured to said floor at said predetermined locations so that each of said plurality of wheels rests on one of said plurality of generally pad-like members when said stretcher is secured within said vehicle, each of said pad-like members being structured to measure the weight of an object placed thereon; and means for displaying the weight of said stretcher, said means for displaying the weight of said stretcher being electrically interconnected to said pad-like members.

9. An apparatus for weighing patients in emergency medical service vehicles as recited in claim 8 wherein said stretcher includes four wheels.

10. An apparatus for weighing patients in emergency medical service vehicles as recited in claim 8 wherein said stretcher includes six wheels.

11. An apparatus for weighing patients in emergency medical service vehicles as recited in claim 8 wherein said means for displaying the weight of said stretcher comprises a digital display.

12. An apparatus for weighing patients in emergency medical service vehicles as recited in claim 8 wherein said vehicle is an ambulance.

13. An apparatus for weighing patients in emergency medical service vehicles comprising:
    a vehicle having a floor, a stretcher with a plurality of wheels and means for securing said stretcher in said vehicle so that each of said plurality of wheels are secured to said floor at a predetermined location;
    a plurality of generally pad-like members secured to said floor at said predetermined locations so that each of said plurality of wheels rests on one of said plurality of generally pad-like members when said stretcher is secured within said vehicle, each of said pad-like members being structured to measure the weight of an object placed thereon;
    means for displaying the weight of said stretcher; and
    means for transmitting a signal corresponding to the weight measured by said pad-like members to said means for displaying the weight of said stretcher.

14. An apparatus for weighing patients in emergency medical service vehicles as recited in claim 13 wherein said stretcher includes four wheels.

15. An apparatus for weighing patients in emergency medical service vehicles as recited in claim 13 wherein said stretcher includes six wheels.

16. An apparatus for weighing patients in emergency medical service vehicles as recited in claim 13 wherein said means for displaying the weight of said stretcher comprises a digital display.

17. An apparatus for weighing patients in emergency medical service vehicles as recited in claim 13 wherein said vehicle is an ambulance.

* * * * *